Figure 1:
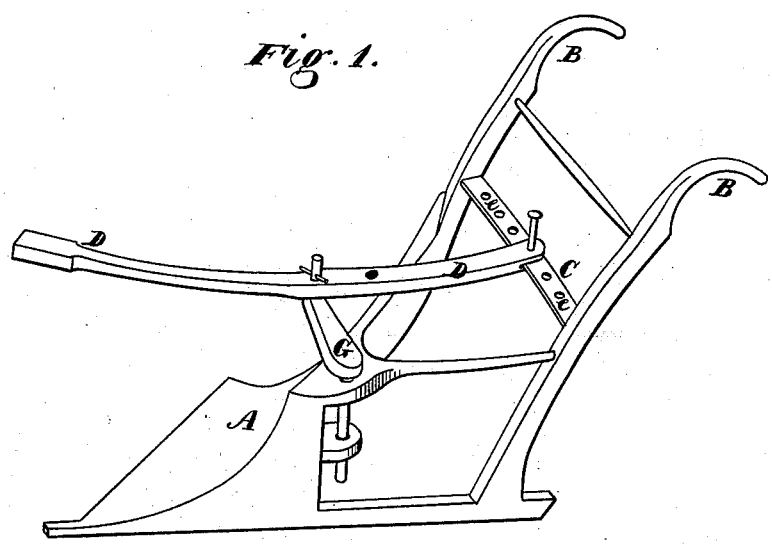

M. ROSS.
Vineyard-Plow.

No. 165,258.

Patented July 6, 1875.

Witnesses
Geo. H. Strong.
Jno. L. Brine

Inventor
Milton Ross
by Dewey & Co
Atty's

UNITED STATES PATENT OFFICE.

MILTON ROSS, OF SAN JOSÉ, CALIFORNIA.

IMPROVEMENT IN VINEYARD-PLOWS.

Specification forming part of Letters Patent No. 165,258, dated July 6, 1875; application filed February 18, 1875.

*To all whom it may concern:*

Be it known that I, MILTON ROSS, of San José, Santa Clara county, State of California, have invented an Improved Vineyard-Plow; and I do hereby declare the following description and accompanying drawings are sufficient to enable any person skilled in the art or science to which it most nearly appertains to make and use my said invention or improvement without further invention or experiment.

My invention relates to improvements in that class of vineyard-plows, in which the rear end of the plow-beam is adjustable between the two handles of the plow, so as to throw the forward end of the beam either to or from the land, for the purpose of clearing the double-trees from the vines or other growing stalks near which it is desired to plow.

My improvement consists in mounting the middle of the beam upon a crank-pin or pivot, by means of which not only the rear end of the beam but its entire length can be shifted to or from the land-side, as desired, and thus permit the beam to be adjusted in any direction, so as to form either an ordinary plow or a vineyard-plow.

Referring to the accompanying drawing, Figure 1 is a perspective view of my plow.

A is the mold-board, and B B the handles of a plow. A plate or bar, C, the front edge of which is curved, connects the handles B B just above the upper edge of the mold-board, and the rear end of the plow-beam D is mortised out, so that the plate C will fit in the mortise. The plate C has holes e e at different points of its length, so that the rear end of the beam can be shifted to any desired point between the handles, and secured by a proper fastening. At the upper forward edge of the mold-board J apply a crank, G, which can rotate in a horizontal plane, as shown, and the upright pin of this crank passes through the beam D at or near its middle, so that by turning the crank the middle and forward end of the beam can also be shifted to or from the point of the plow, as desired.

Several holes may be made through the beam, and the crank-pin may be changed to either hole in order to obtain particular adjustment.

By shifting both the rear end of the beam and the crank the beam can be moved bodily to any desired position, or the direction of either the rear or front end of the beam can be shifted singly, so as to give it any desired angle in either direction. I thus provide a plow which can be used for all kinds of plowing, and at the same time is especially adapted for plowing among vines and standing stalks.

Having thus described my invention, what I claim, and desire to secure by Letters Patent, is—

A plow, having the rear end of its beam D adjustable between the handles, in combination with the crank G for shifting its middle and forward end, substantially as and for the purpose above described.

In witness whereof I hereunto set my hand and seal.

MILTON ROSS. [L. S.]

Witnesses:
JNO. R. SAYERS,
A. M. SAGE.